United States Patent Office 3,503,900
Patented Mar. 31, 1970

3,503,900
FLUID CATALYST AND PREPARATION THEREOF
Walter L. Haden, Jr., Metuchen, and Frank J. Dzierzanowski, Somerset, N.J., assignors to Engelhard Minerals & Chemicals Company, Woodbridge, N.J., a corporation of Delaware
No Drawing. Continuation-in-part of applications Ser. No. 527,744, Feb. 16, 1966, and Ser. No. 530,064, Feb. 25, 1966, which are continuations-in-part of application Ser. No. 343,952, Feb. 11, 1964. This application Jan. 17, 1968, Ser. No. 698,400
Int. Cl. B01j 11/40; C01b 33/28
U.S. Cl. 252—455       12 Claims

ABSTRACT OF THE DISCLOSURE

A zeolitic molecular sieve catalyst is prepared in the form of finely divided, substantially spherical particles by slurrying a mixture of raw (uncalcined) kaolin clay, calcined kaolin clays and sodium silicate solution. The slurry is spray dried and the resulting microspheres are impregnated with a sodium hydroxide solution while the sodium hydroxide solution is mixed with a hydrocarbon liquid. The sodium hydroxide solution is reacted with constituents in the microspheres by maintaining the impregnated microspheres under hydrothermal conditions without dehydration until a zeolitic molecular sieve crystallizes. The crystallized microspheres are base-exchanged to reduce the sodium content and the exchanged particles are thermally activated.

RELATED APPLICATIONS

This application is a continuation-in-part of Ser. No. 527,744, filed Feb. 16, 1966, now U.S. 3,367,886 and Ser. No. 530,064, filed Feb. 25, 1966, now U.S. 3,367,887, which are continuations-in-part of Ser. No. 343,952, filed Feb. 11, 1964, now abandoned.

BACKGROUND OF THE INVENTION

Catalyst particles for fluid hydrocarbon conversion processes must be small enough to be suspended in a stream of hydrocarbon vapors and form a solid-gas system which assumes the flow characteristics of a fluid. The particles preferably should be small generally spherical particles which are usually called "microspheres." These spheres are normally from about 20 to 150 microns in diameter. In addition to possessing the desired degree of activity and selectivity, it is essential that the catalyst particles be sufficiently hard to resist attrition during handling, use and regeneration.

Microspherical catalyst particles suitable for use in fluid bed catalytic conversion processes are frequently prepared by spray drying techniques. An aqueous slurry of suitable composition is sprayed into an atmosphere of hot gases, forming microspheres which are subsequently activated by calcination. This technique has been used successfully to prepare fluid amorphous gel catalysts.

In recent years great interest has developed in a new type of catalyst which contains as a constituent a specific type of crystalline zeolite, namely a rigid three-dimensional crystalline zeolite having uniform pore openings within the range of 6 to 15 Angstrom units. This type of zeolite is usually referred to as a "molecular sieve." Crystalline zeolitic molecular sieves and zeolitic molecular sieve catalysts are described in an article by Ryle Miller, "Molecular Sieve Catalysts," Chemical Week, Nov. 14, 1964, pages 78 to 85.

Fluid zeolitic molecular sieve catalyst composites containing crystalline zeolite in an inorganic oxide gel matrix have been prepared from pre-precipitated crystalline zeolitic molecular sieve powders. In accordance with one procedure, the precipitated zeolite is mixed with a separately formed hydrosol. Globules of the mixture are introduced into an oil medium, as described in U.S. 2,384,-946 to Marisic. In accordance with other procedures, mixtures of zeolite powder and hydrosols are spray dried to produce the microspheres. In carrying out these processes, the zeolite must be crystallized as a step separate and distinct from catalyst preparation. Among other obvious disadvantages, this requires high purity reactants which greatly add to the cost of the finished catalysts.

In efforts to reduce the raw material cost and the number of processing steps involved in the preparation of crystalline zeolitic molecular sieve catalysts, extruded pelleted catalyst composites have been successfully prepared by the hydrothermal reaction in situ of a pelletized extruded mixture of metakaolin (a form of calcined kaolin clay), a finely divided source of reactive silica, uncalcined kaolin clay and an aqueous sodium hydroxide solution. Mechanically strong pellets containing crystalline kaoline clay and a hydrated crystalline zeolitic molecular sieve are formed. The composite pellets are subsequently ion-exchanged and heat activated. The process is described in our patent, U.S. 3,367,886. Ion exchange of the composites with ammonium ion results in cracking catalysts having outstanding activity and selectively along with remarkable thermal stability, including steam stability.

Difficulties have been encountered, however, in applying the features of the pelleted zeolitic molecular sieve catalyst manufacturing technique above described to the preparation of fluid cracking catalysts by spray drying mixtures of raw clay, calcined clay and sodium hydroxide solution. One of the principal difficulties has been the inability to crystallize a sufficient quantity of zeolite to obtain activated composites of the desired activity and selectivity. When attempts were made to spray dry the mixtures of clays and then impregnate the resulting microspheres with a sodium hydroxide solution of sufficient concentration to result in the desired zeolite content in the reacted particles, the microspheres agglomerated or coalesced during impregnation. Soft products which did not meet the desired standards for attrition resistance resulted.

SUMMARY OF THE INVENTION

An object of this invention is to provide high quality zeolitic microspherical catalyst composites by the in situ reaction of sodium hydroxide solution with suitable reactive clay material in the presence of hydrated kaolin clay.

A specific object is to produce fluid zeolitic molecular sieve cracking catalysts from sodium hydroxide solution and a mixture of clay materials by spray drying.

Another object is to provide a method for uniformly impregating relatively concentrated sodium hydroxide solution into reactive clay-containing microspheres in a manner such that the microspheres do not agglomerate and/or coalesce during the impregnation step.

We have invented or discovered a novel process for producing spray dried fluid catalyst particles of the zeolitic molecular sieve type from a mixture of sodium hydroxide solution and clays. The process of the invention has resulted in the production from relatively inexpensive raw material of fluid cracking catalysts which compare favorably with the highest qualiy zeolitic molecular sieve fluid catalysts presently available.

Briefly stated, in accordance with the present invention, fluid zeolitic catalyst particles are prepared by a method comprising the following steps:

(1) A slurry comprising the following essential ingredients is formed: water, metakaolin (a specific form of dehydrated kaolin clay), a finely divided source of alkali-reactive silica, a substantial amount of raw (hydrated) kaolin clay and a small amount of water-dispersible hydrophilic colloidal binder material, preferably sodium silicate.

(2) The slurry is sprayed into hot air, forming microspheres.

When the preferred sodium silicate binder is employed, sodium carbonate may be formed along with a silicic material (probably silicic acid gel) during the spray drying step.

(3) The microspheres are impregnated with an aqueous solution of sodium hydroxide while the solution is mixed with an inert, water-immiscible hydrocarbon liquid. The aqueous solution contains a quantity of sodium oxide calculated to provide a desired quantity of crystalline sodium aluminosilicate zeolite when reacted with constituents in the microspheres (metakaolin and source of silica). Another requirement of the impregnation step is that the hydrocarbon liquid is present in amount sufficient to form a mixture with the sodium hydroxide solution which will cover completely the microspheres while they are being impregnated. The microspheres are maintained in contact with the mixture of sodium hydroxide solution and hydrocarbon liquid until the aqueous phase of the mixture is absorbed into the microspheres.

As a result of the presence of the immiscible liquid during impregnation, the microspheres do not coalesce during or after the impregnation and are maintained in discrete, nonagglomerated form in spite of the fact that large quantities of caustic have been impregnated into the spray dried masses. As a result of the presence of the binder material, the microspheres do not break up or become dispersed in the impregnation medium.

(4) The impregnated microspheres are aged and then crystallized by subjecting them to hydrothermal treatment under at least autogeneous pressure while minimizing dehydration. The aging and crystallization are preferably carried out in the presence of the immiscible liquid that was present during the impregnation step.

During reaction and crystallization, a sodium silicate binder serves the additional role of preventing or minimizing agglomeration of the microspheres when the reaction and crystallization also take place in the presence of a water-immiscible liquid. Sodium silicate also leads to the production of activated composites of outstanding mechanical strength, especially when the composites are heat treated before use at temperatures within the range of about 1200° F. to 1600° F., preferably 1350° F. to 1550° F.

The crystallized microspheres, which constitute a base material for catalyst manufacture, are ion-exchanged to produce fluid particles of desired catalytic properties and the ion-exchanged particles are thermally activated.

Before describing our invention in further detail, it should be pointed out that the term "free moisture" or "F.M." as used herein, refers to the weight percent of a material that is eliminated when the material is heated to essentially constant weight with a Cenco Moisture Balance. This instrument employs a sensitive torsional balance for weighing a sample and an infrared lamp for drying the sample. "Volatile matter" or "V.M." is the weight percent of a material that is eliminated when the material is heated to essentially constant weight at 1800° F. In the case of kaolin clay, water accounts for virtually all of the volatile matter and free moisture.

The term "kaolin clay" as used herein encompasses clays the predominating mineral constituent of which may be kaolinite, dickite, anauxite, nacrite or halloysite. The aforementioned minerals are hydrous crystalline aluminum silicates of the formula $Al_2O_3 \cdot 2SiO_2 \cdot XH_2O$, wherein X is usually 2, except in the case of certain halloysites in which X is 4. "Raw" kaolin clay is kaolin clay which contains its natural water of hydration.

Calcination eliminates chemically combined water (water of crystallization) from kaolin clay. When an appreciable quantity of chemically combined water is removed from the lattice of kaolinitic minerals, the crystal structure is destroyed. The resulting material is amorphous in the sense that it does not contain crystallites of a size sufficient to diffract X-radiation.

DETAILED DESCRIPTION OF THE INVENTION

Preparation of spray dryer feed

The function of the spray drying step is to provide a mixture of raw plastic clay, metakaolin and finely divided source of silica in the form of discrete microspheres of a size and shape suitable for fluid bed hydrocarbon conversion processes. Suggested proportions are from 5 to 400 parts by weight of raw clay (moisture-free clay weight basis) to 100 parts by weight of combined metakaolin and finely divided source reactive silica. The reactive silica may be silica gel, diatomaceous earth of the like.

The preferred source of reactive silica is kaolin clay which has previously been calcined at a temperature and for a time such that the characteristic kaolin exotherm at about 1725° F. has taken place after dehydration of the clay has been substantially complete. The calcination may be carried out at a temperature within the range of about 1600° F. to about 2000° F. The resulting calcined clay material is virtually amorphous to X-rays. When tested by standard differential thermal analysis (DTA), the calcined clay does not exhibit the characteristic kaolin clay endotherm at about 1075° F. and does not exhibit a substantial exothermic peak at about 1725° F. Metakaolin, in contrast, is obtained by thermally dehydrating (calcining) kaolin clay at a temperature within the range of about 1000° F. to about 1550° F. until the volatile matter content of the clay is below about 2 percent. Under these conditions, the clay does not undergo the characteristic kaolin exotherm after dehydration is substantially completed. In other words, metakaolin is obtained by calcining kaolin clay at a temperature and for a time such that the calcined clay undergoes a characteristic strong exothermic reaction at about 1725° F. but does not exhibit the characteristic endotherm at about 1075° F. The kaolin endotherm and exotherm can be readily determined by differential thermal analysis (DTA), using the technique described in Ralph E. Grim's "Clay Mineralogy," page 203, published by McGraw-Hill Book Company, Inc. (1953).

A detailed description of a method for calcining kaolin clay in a Nichols-Herreshoff furnace appears in U.S. 3,014,836 to William J. Proctor, Jr. To obtain metakaolin by the procedure of said patent, the kaolin would be carried only through Heating Zone No. 3 in the Nichols-Herreshoff furnace to remove substantially all chemically-bound water and the clay would then be discharged from the furnace. Kaolin clay that has passed through the exotherm during calcination can be obtained by carrying the clay through the seven heating zones of the Nichols-Herreshoff furnace, as described in U.S. 3,014,836 (supra).

Proportions of metakaolin to the higher temperature dehydrated kaolin clay fall within the range of 0 to 55 parts by weight metakaolin in 100 to 45 parts by weight of high temperature calcined clay (e.g., 15 parts by weight metakaolin to 85 parts by weight of high temperature calcined clay). The ratio of these calcined clays affects the stability of the catalyst. This in turn affects the durability of the catalyst. Exceptionally good stability is obtained using an especially preferred ratio of about 10 to 25 parts by weight of metakaolin to 90 to 75 parts by weight of the higher temperature calcined clay. For every 100 parts by weight of the combined calcined kaolin clays, the raw kaolin clay is employed in amount within the range of about 50 to 400 parts by weight, preferably about 200 parts by weight (moisture-free weight basis). Thus, the reaction mixture contains a substantial quantity of raw, uncalcined kaolin clay.

The use of fine particle size raw clay is recommended since the use of fine raw kaolin clay leads to the formation of harder products than coarse raw clays. For example, fine paper coating clays, e.g., clays containing 80 to 90 percent by weight of minus 2 micron particles, or degritted whole clays having an average particle size of about 1½ microns, produce much harder catalysts than catalysts obtained with coarse filler clays, e.g., raw kaolin clays having an average size of 4 to 5 microns. The raw kaolin clay may be a kaolinitic or halloysitic clay or it may be a clay composed of nacrite, dickite, etc. Hard or soft kaolins may be employed. Hard kaolins are desirable because of the fine particle size. However, the kaolin must have a low iron content, e.g., below 1 percent $Fe_2O_3$ by weight, and some hard clay may be unsuitable because of the high iron content.

Especially good results have been realized employing water-soluble sodium silicate solution as the binder. Sodium silicate binds the wet microspheres and maintains the coherent form of the microspheres during impregnation when the microspheres are wet. Comparatively small amounts of sodium silicate are effective in binding the microspheres to prevent disintegration during impregnation and hydrothermal aging and crystallization. For example, "N" brand sodium silicate solution, which contains 37.6 percent solids, prevents disintegration of the spray dried mixture of clays during impregnation when employed in amount of only 5 percent of the total clay weight (including calcined clay). This quantity corresponds to somewhat less than 2 percent sodium silicate solids, based on the clay weight. We may employ substantially larger quantities of sodium silicate, i.e., from 10 to 20 percent sodium silicate (dry basis), based on the clay weight.

Other hydrophilic colloidal material, such as polymeric gums, latexes, starches and polycarboxylic polymers, can be employed alone or in combination with each other or with sodium silicate to bind the microspheres and prevent disintegration during collection, impregnation and/or reaction and crystallization.

Some of the sodium hydroxide required for zeolite formation can be present in the slurry that is charged to the spray dryer when the gases in the dryer are free from combustion gases. We prefer, however, to incorporate all of the caustic required for zeolite formation by impregnating preformed spray dried microspheres with a solution of the caustic, as described hereinafter.

The quantity of water that is used to prepare the spray dryer feed must be sufficient to form a fluid, sprayable slurry with the clays and binder. This quantity will vary with the water content of the constituents of the slurry and the presence of materials which have a flocculating or deflocculating action on these constituents. Recommended is the use of water in amount sufficient to produce a slurry having a total solids content within the range of 40 to 60 percent, preferably about 50 percent. The use of high solids slurries leads to denser microspheres which generally are stronger than the lighter microspheres obtained by spray drying at lower solids.

Ingredients such as hardening agents, deflocculating agents, combustible filler, etc., can be present in the slurry.

Several procedures can be followed in mixing the ingredients to form the slurry. One procedure is to dry blend the finely divided solids, add the water and then the binder solution. Other sequences may be employed. The components can be mechanically worked together or individually to produce desired viscosity characteristics.

Spray drying

Spray dryers with countercurrent, cocurrent or mixed countercurrent and cocurrent flow of slurry and hot air can be employed to produce the microspheres. The air may be heated electrically or by other indirect means. Combustion gases obtained by burning hydrocarbon fuel in air can be used.

Spray drying results in the evaporation of water from droplets of the slurry and the formation of microspheres. Microspheres about 20 to 150 microns in equivalent spherical diameter are desired for most catalytic operations using fluidized contact masses.

Using a cocurrent dryer, air inlet temperatures up to 1200° F. may be used when the clay feed is charged at a rate sufficient to produce an air outlet temperature within the range of 250 to 600° F. At these temperatures, free moisture is removed from the slurry without removing water of hydration (water of crystallization) from the raw clay ingredient. By spray drying the clay without removing water of crystallization, the reactivity of the microspheres with the sodium hydroxide can be predicted on the basis of the reactivity of similar mixtures of raw and calcined clays. Controlled dehydration of some of the raw clay during spray drying is, however, within the scope of the invention.

After they have been formed, the microspheres may be prehardened by post-drying at temperatures below which the raw (hydrated) kaolin clay is dehydrated. The post drying may be carried out at temperatures up to about 800° F. without dehydrating the raw kaolin clay constituent although temperatures above 800° F. may be used if the drying conditions are controlled to avoid substantial dehydration of the raw clay. Especially when concentrated sodium hydroxide solutions are used (e.g., solutions of 25 to 30 percent concentration), the post drying may increase the amount of zeolite that is formed.

Impregnation of microspheres with sodium hydroxide solutions

An essential feature of the process of the invention is that the sodium hydroxide solution is contacted with the microspheres while the solution is being agitated with an inert, immiscible hydrocarbon liquid, such as mineral oil or lubricating oil. The hydrocarbon liquid must be employed in amount such that the combined volume of sodium hydroxide solution and hydrocarbon liquid covers completely the microspheres. Practical limitations dictate an upper limit to the quantity of hydrocarbon liquid. Suitable proportions are within the range of about 100 to 1000 parts by weight hydrocarbon liquid to 100 parts by weight sodium hydroxide solution.

The hydrocarbon liquid and sodium hydroxide solution may be agitated together before the microspheres are added. Alternatively, the sodium hydroxide solution may be added to the slurry of the microspheres in all or a portion of the hydrocarbon liquid. The mixture is thereby formed in situ in the presence of the microspheres. It is also within the scope of the invention to mix the microspheres in sodium hydroxide solution and then add hydrocarbon liquid.

During the impregnation step, the mixture of microspheres, hydrocarbon liquid and sodium hydroxide solution should be agitated at a rate of shear sufficiently high to form a mixture having the appearance of a W/O emulsion. In other words, the aqueous phase should appear to be dispersed in the hydrocarbon liquid phase. The rate of shear must obviously not be so high that the microspheres will break down or disintegrate during the impregnation.

In order to crystallize an adequate quantity of zeolite, the sodium hydroxide must be employed in amount sufficient to provide a suitable quantity of sodium oxide. With microspheres comprising raw clay and the mixture of calcined clays, sodium hydroxide solution is employed in amount sufficient to provide at least about 0.5 mole $Na_2O$ per mole $Al_2O_3$ in the mixture of calcined clays. Preferably the microspheres are impregnated with about 0.6 to 0.8 moles $Na_2O$ per mole $Al_2O_3$ in the calcined clays. When appreciably more than 0.8 moles of $Na_2O$ is employed per mole of $Al_2O_3$ in the calcined clays, difficulty may be experienced in crystallizing a desired high silica-to-alumina ratio form of faujasite zeolite. When appreciably less than 0.6 moles of $Na_2O$ is used, an insufficient quantity of zeolite may be crystallized in the reaction masses.

Sodium hydroxide solutions of about 15 to 30 percent (weight) concentration may be employed. The concentration should be correlated with the absorptive properties of the microspheres to assure that the calculated quantity of sodium hydroxide is impregnated. The amount of crystallization obtained with sodium hydroxide solutions of 30 percent concentration is generally less than the amount of zeolite that would be formed employing more dilute solutions. On the other hand, difficulty may be experienced in realizing optimum hardness with sodium hydroxide solutions as dilute as 15 percent.

A hydrocarbon oil having a high flash point is recommended as the hydrocarbon liquid constituent of the impregnation medium. Such oil can be maintained in contact with the impregnated microspheres throughout the subsequently hydrothermal treatment during which the oil acts as (1) a heat-transfer medium, controlling the temperature cycle, and (2) a vehicle to maintain the microspheres in discrete nonagglomerated form.

A surface active agent may be incorporated in the impregnation medium provided such agent is not detrimental to product quality, especially hardness. It is not necessary to employ a surface active agent since agitation of the microspheres in the presence of the mixture of oil and sodium hydroxide solution maintains the oil and caustic solution in an apparently emulsified condition.

Impregnation can be carried out at ambient temperature in open or closed vessels.

Impregnation proceeds rapidly because of the absorptive nature of the clays and a contact period of a few minutes usually will suffice to complete the impregnation of the microspheres. To assure complete impregnation, it is suggested that the microspheres be agitated with the liquid mixture for about ¼ to 2 hours. After impregnation is complete, all of the aqueous phase is absorbed in the microspheres and the microspheres are surrounded by the hydrocarbon liquid.

Aging and crystallization

The impregnated microspheres are preferably aged in the presence of the original hydrocarbon liquid at about 70° F. to 130° F. under conditions which prevent dehydration for at least about 6 hours, preferably 12 to 24 hours. The microspheres harden as a result of reaction that takes place during the aging step. The reacted microspheres harden further when subsequently crystallized and may undergo an additional substantial increase in hardness when thermally activated after crystallization and ion-exchange. The aging may be carried out in a quiescent environment or in a dynamic system provided with means to prevent or minimize dehydration.

Crystallization of the reacted microspheres is also carried out under conditions such that dehydration is minimized or prevented. Temperatures within the range of about 150° F. to 250° F. are suitable for crystallization. A preferred crystallization temperature is about 200° F. Crystallization time is usually within the range of 24 to 74 hours. The crystallization is preferably carried out while the microspheres are immersed in a hydrocarbon liquid in order to maintain the microspheres in discrete form. The hydrocarbon liquid may be the same that was employed in the impregnation and/or aging steps. This phase of the hydrothermal treatment can be carried out in a static or dynamic system.

It is desirable to provide reactants and reaction conditions which result in products containing about 15 to 40 percent by weight zeolitic molecular sieve before activation. The percent zeolite is determined by estimation of X-ray line intensities. Preferably the products contain about 25 to 30 percent zeolite before activation because the resulting activated products generally combine high activity and selectivity to gasoline with good mechanical strength.

Factors which affect the percent zeolite include: ratio of $Na_2O$ to $Al_2O_3$ in the reaction mixture, caustic concentration, the selection of a quiescent or agitated system during aging and crystallization, aging and crystallization temperature and time.

The crystalline material that is formed is a sodium aluminosilicate which has an X-ray diffraction pattern corresponding substantially to that of a rigid three-dimensional zeolite having uniform pore openings within the range of 6 to 15 Angstrom units. Preferably the zeolitic molecular sieve is a synthetic sodium faujasite, e.g., zeolite X or zeolite Y. Using our preferred reaction mixtures, which includes a mixture of raw hydrated kaolin clay and the two different forms of calcined clays, the crystalline material has an X-ray diffraction pattern corresponding substantially to that of the material referred to as zeolite Y in U.S. 3,130,007, preferably a form of the zeolite having a $SiO_2/Al_2O_3$ ratio above 4 (as determined by X-ray diffraction). At this point of the process an X-ray pattern of the product also will show the presence of a substantial amount of crystalline kaolin clay.

Removal of oil

Adherent oil should be removed before the crystallized base material is ion-exchanged, as described below. Suggested methods for removing oil include filtration, settling, aqueous displacement and solvent extraction. The details will vary with the oil used and the available equipment.

Base-exchange

The sodium zeolite is ion-exchanged to prepare catalysts of specific desired properties. For example, the following ionizable compounds can be used to replace a substantial amount of the alkali metal of the zeolite: salts of ammonium, barium, calcium, magnesium, manganese, vanadium, chromium, cobalt, nickel, iron, zinc, aluminum, rare earth metals (lanthanum, praesodymium, neodymium, cerium and samarium), hydrogen, noble metals such as platinum and palladium, mixtures of the foregoing together or with ammonium. The specific effects of these, as well as other cations, of Group Ib through Group VIII of the Periodic Table on molecular sieve-type cracking and hydrocracking catalysts are well known in the art. Reference is made to Chemical Week (supra) and patents referred to therein. In producing a cracking catalyst, we presently prefer to use an ammonium salt in the ion-exchange step and to exchange sufficient sodium ions in the base material to produce an activated product containing from about ¼ to 3 percent $Na_2O$ by weight (based on the volatile-free weight of the catalyst). The salts used in the base exchange operation may be inorganic, such as the chloride, sulfate, carbonate or nitrate or organic, such as the acetate. Normally, the ionizable salt will be used in the form of an aqeuous solution. Conditions of time and temperature for base exchanging alkali metal aluminosilicates are well known and can be used in carrying out the ion exchange.

Activation

To activate the ion-exchanged masses and adjust the activity to a desired level, the masses may be steamed at about 1000° F. to about 1600° F. with 100 percent steam for 2 to 4 hours. This steaming also dehydrates the masses and hardens them. If desired, the masses may be calcined in air at temperatures of the order of 800° F. to 1200° F. for times ranging from ½ to 24 hours before the steaming operation or they can be calcined in air at temperatures up to about 1700° F. instead of steaming. It is also within the scope of the invention to activate the particles in the catalytic unit.

To produce cracking catalysts of optimum selectivity and activity, the activation should be carried out at relatively high temperature. For example, a preferred activation treatment is to calcine the microspheres in air at a temperature within the range of about 1400° F. to 1600° F. or to calcine the microspheres in steam at temperatures within the range of about 1050° F. to 1350° F. for about 4 hours.

Activation may reduce the apparent quantity of zeolite (as determined by X-ray analysis) and it also decreases surface area of the microspheres. For example, crystalline microspheres having a surface area of about 175 m.$^2$/g. before activation may have a surface area well below 150 m.$^2$/g. after activation. In fact, at the preferred elevated activation temperatures, the surface area may be of the order of 110 to 130 m.$^2$/g.

used and cracking was carried out at 900° F. with 10 percent steam and a liquid space rate of 1.0 (ml. oil)/(hr.)/(cc. catalyst) for a 15-minute operation period. To place the microspheres in a physical form amenable to CAT–D testing, samples were tabletted by adding 2 percent by weight of "Sterotex" (a fatty acid) and compressing the mixture into 3/16" diameter pellets in a Stokes press.

The term "kaolin coke factor" used in presenting catalytic data refers to a value obtained by comparing coke made of the experimental catalyst with that of a commercial kaolin catalyst at the same conversion (extrapolated.)

The clays used in the illustrative examples were all water-washed, processed clays characterized as follows:

| Physical Characteristics | Satintone #1 | Satintone #2 | KWW |
|---|---|---|---|
| Specific gravity | 2.63 | 2.50 | 2.58. |
| Moisture, maximum wt. percent. | 1.0 | 1.0 | 1.0. |
| Wt. percent + 325 mesh (wet screen). | 0.5 | 0.5 | 0.15. |
| Average particle size, microns. | 2.0 | 4.5 | 1.5. |
| pH | 5.8–6.3 | 5.8–6.3 | 4.2–5.0. |
| Typical chemical analysis (moisture-free weight basis): | | | |
| Ignition loss at 1,800° F., percent. | 0.5 | 0.9 | 13.8. |
| Silica, percent | 52.3 | 52.1 | 45.4. |
| Alumina, percent | 44.6 | 44.4 | 38.8. |
| Iron oxide, percent | Trace | Trace | 0.3. |
| Titanium dioxide, percent | 2.0 | 2.0 | 1.5. |
| Processing | Calcined above exotherm. | Calcined below exotherm. | Uncalcined (raw) fractionated clay. |
| Composition | Amorphous | Amorphous (metakaolin). | Crystalline (kaolinite). |

EXAMPLE

This invention and its features will be understod more fully by the following example.

All X-ray diffraction data included herein refer to patterns obtained from random powder patterns using a K-alpha doublet of copper as the source of X-radiation, a receiving slit width of 0.006", a Norelco specimen holder having a sample area of 0.812" x 0.408", a scintillation counter with pulse height analyzer, a scanning rate of 4° per minute, a time constant of 2 seconds, a scanning direction increasing from 2° to 90° and a strip chart pen recorder. Specimens were equilibrated at about 25° C. and 40 percent to 50 percent relative humidity for at least 18 hours prior to X-raying. Peak heights (counts per second, or "C/S") and positions were recorded on a strip chart.

In view of the similarity between the diffraction patterns of zeolites X and Y, each of which has a characteristic maximum at 6.2° 20, zeolite X was distinguished from zeolite Y by applying to X-ray powder diffraction patterns of products the criterion set forth in Table III of a publication by Donald C. Freeman, Jr. entitled "Electrical Conductivity of Synthetic Crystalline Zeolites," Journal of Chemical Physics, vol. 35, No. 3, September 1961. Table III in said publications correlates unit cell dimension with $SiO_2/Al_2O_3$ ratio. The silica-to-alumina molar ratios of zeolite Y products were determined from the unit cell dimensions derived from X-ray diffraction patterns.

In estimating percent zeolite of products, a commercial sample of high purity sodium zeolite was used as the reference. Percent sieve in samples was estimated by observing the intensity of three characteristic peaks in C/S and comparing the intensities of these peaks with the intensities of the corresponding peaks in the commercial sample.

The "CAT–D–1" test referred to in the example is described by Clifford G. Harriz in "To Test Catalytic Cracking Activity," HYDROCARBON PROCESSING, October 1966, vol. 45, No. 10, pages 183–188. In carrying out the CAT–D–1 test, a heavy gas oil feedstock was Preparation of reaction microspheres In accordance with the present invention, "KWW" kaolin, in amount of 37.8 lbs. was blended with 16.2 lbs. "Satintone #1," 2.7 lbs. "Satintone #2," 6.2 lbs. "N" brand sodium silicate solution (8.90 percent $Na_2O$, 28.7 percent $SiO_2$, weight basis) and 50.6 lbs. distilled water. The mixing was carried out with a "Lightin' Mixer."

The aqueous slurry, which contained 52 percent solids, was spray dried in a 5 x 5 ft. gas fired spray drier using an atomizer wheel speed of 15,000 r.p.m. Air inlet and outlet temperatures were about 1100° F. and 250° F. to 300° F., respectively.

The chamber product of the spray drier had a bulk density of 0.704 g./cc. and the following screen analysis:

Mesh (Tyler): Wt. percent
plus 100 _____ 16.6
100/140 _____ 10.2
140/200 _____ 33.4
200/325 _____ 31.8
minus 325 _____ 8.0

Impregnation of microspheres, aging and crystallization of zeolite

The spray dried microspheres were divided into three portions, each of which was impregnated as follows.

A 20 percent aqueous solution of sodium hydroxide was mixed in a one-gallon glass jar with "Inkol No. 0" using 360 ml. of the sodium hydroxide solution and 2280 ml. of oil. "Inkol No. 0" is a light-colored petroleum distillate prepared from crude oil. The oil has an A.P.I. gravity at 60° F. of 41.0 and a specific gravity at 60° F. of 0.820. Flashpoint—COC is 240° F. Kauri butanol value is 28. Viscosity at 100° F. is 2.53 centistokes.

The mixture was agitated vigorously in the jar with a Lightin' Mixer forming what appeared to be a W/O emulsion. The quantity of sodium hydroxide employed was calculated to provide 0.63 moles $Na_2O$ per mole $Al_2O_3$ in the mixture of calcined clays ("Satintones"). To the well-mixed ingredients, 1200 grams of the above-described spray dried microspheres were added and agitation was continued for 15 minutes. During the mixing step, the microspheres appeared to be flocculated. At the end of 15 mintues, all of the sodium hydroxide solution was absorbed by the microspheres. The jar was then sealed and placed in an electric oven at 100° F. for 24 hours. Following this, the sealed jar was placed in a 200° F. oven for 48 hours.

The oil was removed from the microspheres by filtration and the microspheres were washed with petroleum ether to remove residual oil.

The zeolite content and silica-to-alumina molar ratio of each batch was estimated by the X-ray diffraction method. All of the batches contained about 31 percent sodium zeolite Y. The silica-to-alumina molar ratios of the zeolites were 4.11, 4.15 and 4.22. The X-ray patterns of all products showed that substantial quantities of kaolinite were also present.

Ion-exchange and activation

The washed microspheres were combined and exchanged batchwise with a 1 N aqueous solution of ammonium nitrate. The ratio of $NH_4+$ in solution per equivalent of $Na+$ in the microspheres used for the three exchanges were 1.40, 1.25 and 1.80, respectively. After each exchange, the product was washed with distilled water to remove absorbed exchange solution. The ion-exchanged microspheres were dried at 200° F. for 18 hours. The product contained 40 percent zeolite Y (as estimated from X-ray patterns) and contained 1.58 percent $Na_2O$, on a volatile-free basis, as determined by a sodium specific electrode.

A half-gallon sample of dried ammonium exchanged sample was activated by calcining the microspheres in a muffle furnace at a product temperature slightly below 1600° F. for 4 hours. The resulting product contained an estimated 12 percent zeolite Y as determined by X-ray. The minus 200 mesh, plus 325 mesh fraction had a bulk density of 0.792 g./cc. True particle density was 2.60 g./cc. Apparent density was 1.62 g./cc.

A commercial fluid zeolitic molecular sieve catalyst containing 1.57 percent rare earths was calcined in air at 1050° F. for 3 hours, pelleted in similar manner and the catalytic properties were evaluated by the CAT-D test. By chemical analysis, the commercial catalyst contained 18.92 percent volatile matter and (on a V.F. basis 48.98 percent $Al_2O_3$ and 48.88 percent $SiO_2$. The commercial catalyst was similar to the experimental catalyst in particle size distribution, loose density and packed density. To compare steam stability of the commerical catalyst with the experimental catalyst, the commerical catalyst was steamed at 1500° F. for 4 hours with 100 percent steam.

Attrition resistance of 200/325 mesh (Tyler) fraction fluid cracking catalysts was evaluated as follows. Catalyst samples were equilibrated at 60 percent relative humidity and 74° F. after a 1050 F. calcination treatment and the densities of the equilibrated samples were determined by a pycnometer. From the density value obtained from the pycnometer reading, the "test" density of the sample equilibrated at 60 percent relative humidity was determined. From the "test density," a calculation was made to determine the quantity of air at 60 percent relative humidity at 74° F. required to elutriate a 20 micron fraction using a 4½″ diameter elutriation chamber. Using 13.00 grams of fluid catalyst sample, the sample was attrited in a Roller Particle Size Analyzer. Figure I of a publication "Instruction for Roller Particle Size Analyzer" (Catalog No. 5–445, American Instrument Company, Silver Spring, Md.) illustrates the apparatus that was used.

The "attrition value" was the weight loss of the 13.00 gram sample after being attrited a specified number of hours. The percent attrition loss was determined by dividing the loss by the weight of original sample and expressing the result as a percentage. A curve was drawn correlating percent loss with test duration. From the slope of the curve at the ordinate representing a specific test period, the percent loss per hour at that test period was determined. The results are also reported in the table containing the cracking data.

PROPERTIES OF FLUID ZEOLITIC MOLECULAR SIEVE CRACKING CATALYSTS

| Catalytic Properties | Experimental Catalyst | | Commercial Catalyst | |
|---|---|---|---|---|
| | Calcined air 1,600° F./4 hr. | Calcined air 1,600° F./4 hr. & steamed at 1,500° F./4 hr. | Steamed at 1,400° F./4 hr. | Steamed at 1,500° F./4 hr. |
| Gasoline, vol. percent | 50.9 | 47.5 | 58.0 | 42.4 |
| Gasoline, wt. percent | 42.5 | 39.8 | 48.1 | 35.2 |
| Coke, wt. percent | 7.62 | 1.27 | 4.84 | 2.68 |
| Gas, wt. percent | 27.4 | 8.1 | 19.5 | 13.5 |
| Gas gravity (air=1) | 1.57 | 1.27 | 1.54 | 1.42 |
| Conversion (wt. percent) | 77.4 | 49.1 | 72.4 | 51.3 |
| Kaolin coke factor | 0.66 | 0.44 | 0.54 | 0.83 |
| Cracking efficiency | 54.9 | 81.1 | 66.4 | 6.68 |
| Bulk density | 0.707 | 0.697 | 0.681 | |

| Hardness, attrition loss | 1,600° F./4 hr. in muffle furnace | 1,350° F./4 hr. in muffle furnace |
|---|---|---|
| Percent loss at 20 hours | 13.0 | 25.2 |
| Percent loss/hr. at 20 hr. level | 0.70 | 1.0 |

The data in the table show that the calcined, unsteamed experimental catalyst was initially more active than the commercial catalyst although the latter was somewhat more selective. After a 1500° F. steam treatment, however, the experimental catalyst was less active although somewhat more selective than the steamed experimental catalyst and operated at a higher cracking efficiency, thus demonstrating that the experimental catalyst was superior in its stability towards steam.

The hardness data, also reported in the table, indicate that the product of the invention was markedly more resistant to attrition than the experimental catalyst during the 20 hour test period. The data further indicated that at 20 hours the experimental catalyst attrited at a lower rate than the experimental catalyst.

We claim:
1. A method for producing a fluid zeolitic composite base material in the form of microspheres and adapted for use in the preparation of a cracking catalyst which comprises:
   (1) forming a slurray comprising water, hydrated kaolin clay, metakaolin, a finely divided source of silica and hydrophilic colloidal binder material selected from the group consisting of sodium silicate, latex, starch, and mixtures thereof,
   (2) spray drying said slurry into hot air, thereby forming discrete microspheres;
   (3) forming a mixture of said microspheres with an aqueous solution of sodium hydroxide and an inert, water-immiscible hydrocarbon liquid, said mixture containing a quantity of sodium hydroxide sufficient to form a substantial quantity of zeolitic molecular sieve by reaction with said metakaolin and source of silica in said microspheres and containing hydrocarbon liquid and sodium hydroxide solution in amount sufficient to immerse completely the microspheres in a liquid phase;
   (4) agitating said mixture until said sodium hydroxide solution is impregnated into the microspheres, and
   (5) subjecting the impregnated microspheres to hydrothermal treatment while preventing dehydration until zeolitic molecular sieve is crystallized in the presence of said hydrated kaolin clay in said microspheres, thereby producing the composite catalyst base material in microspherical form.
2. The method of claim 1 wherein said binder is sodium silicate.

3. The method of claim 1 wherein said hydrothermal treatment is carried out while said impregnated microspheres are immersed in said hydrocarbon liquid.

4. The method of claim 1 wherein said hydrocarbon liquid is an oil and said hydrothermal treatment is carried out while said impregnated microspheres are immersed in said oil.

5. The method of claim 1 including the steps of exchanging sodium ions in said base material with ammonium ions and activating said base material by calcination in air at a temperature within the range of 1400° F. to 1600° F.

6. A method for impregnating absorptive, friable, clay-containing microspheres with a controlled quantity of aqueous alkaline solution while avoiding the tendency of the microspheres to agglomerate during the impregnation which comprises forming a suspension of said microspheres in an agitated mixture of said aqueous alkaline solution and inert, water-immiscible hydrocarbon liquid, said mixture having the appearance of a water-in-oil emulsion and having a volume sufficient to cover completely the microspheres suspended therein, the quantity of aqueous alkaline solution not exceeding substantially that which can be impregnated into said microspheres, continuously agitating said suspension until substantially all of said aqueous alkaline solution is impregnated therein, and separating the microspheres from the hydrocarbon liquid in which they are suspended.

7. The method of claim 6 wherein said microspheres comprise a spray dried mixture of uncalcined kaolin clay, metakaolin, finely divided source of silica and hydrophilic colloidal binder selected from the group consisting of sodium silicate, latex, starch and mixtures thereof.

8. The method of claim 6 wherein said microspheres comprise a spray dried mixture of uncalcined kaolin clay and a mixture of calcined kaolin clays.

9. A method for producing a zeolitic molecular sieve cracking catalyst which comprises:
  (1) forming a slurry comprising water, sodium silicate, raw kaolin clay and amorphous calcined kaolin clay including (a) metakaolin and (b) kaolin clay that had been dehydrated at a temperature and for a time such that the clay had passed through the characteristic exotherm at about 1725° F. after dehydration was substantially completed,
  (2) spraying said slurry in hot air, thereby forming discrete coherent microspheres comprising raw clay, calcined clays and binder derived from sodium silicate,
  (3) forming a mixture of said microspheres with an aqueous solution of sodium hydroxide and a hydrocarbon oil, the solution of sodium hydroxide being of 15 to 30 percent concentration and containing 0.5 to 1 mole $Na_2O$ per mole $Al_2O_3$ in said calcined clays, and said hydrocarbon oil being present in quantity sufficient to form a mixture with said sodium hydroxide solution that has the appearance of a water-in-oil emulsion and has a volume capable of covering completely said microspheres when said microspheres are present therein;
  (4) continuously agitating said mixture until substantially all of said sodium hydroxide solution is impregnated into said microspheres,
  (5) while said microspheres are still in contact with at least a portion of said hydrocarbon liquid originally present, subjecting the impregnated microspheres to hydrothermal treatment while preventing dehydration until zeolitic molecular sieve having substantially the X-ray diffraction pattern of a sodium faujasite crystallizes in the presence of raw kaolin clay,
  (6) removing hydrocarbon liquid from said crystallized microspheres,
  (7) exchanging sodium cations in said crystallized microspheres with nonalkali metal cations, and
  (8) thermally activating the exchanged microspheres.

10. The method of claim 9 wherein sodium cations are exchanged with ammonium ions.

11. The method of claim 9 wherein sodium cations are exchanged with ammonium ions and said microspheres are activated by calcining them in the presence of air at a temperature within the range of 1400° F. to 1600° F.

12. The product of claim 9.

References Cited
UNITED STATES PATENTS

| | | | |
|---|---|---|---|
| 3,234,147 | 2/1966 | Drost et al. | 252—455 |
| 3,367,886 | 2/1968 | Haden, et al. | 252—455 |
| 3,367,887 | 2/1968 | Haden, et al. | 252—455 |
| 3,433,587 | 3/1969 | Haden, et al. | 23—112 |

DANIEL E. WYMAN, Primary Examiner

C. F. DEES, Assistant Examiner

U.S. Cl. X.R.

23—112